United States Patent [19]

Sheen et al.

[11] Patent Number: 5,751,511
[45] Date of Patent: May 12, 1998

[54] CAPSTAN PHASE CONTROL METHOD FOR VIDEO CASSETTE TAPE RECORDER

[75] Inventors: Yong-Hoo Sheen, Kyungki-Do; Gwi-Tae Park, Seoul; Ji-Yoon Yoo, Seoul; Sang-Lak Lee, Seoul, all of Rep. of Korea

[73] Assignee: LG Electronics Inc., Seoul, Rep. of Korea

[21] Appl. No.: 592,172

[22] Filed: Jan. 26, 1996

[30] Foreign Application Priority Data

Jan. 28, 1995 [KR] Rep. of Korea ............... 1746/1995

[51] Int. Cl.$^6$ ......................................... G11B 15/52
[52] U.S. Cl. .............................. 360/73.11; 360/73.12; 360/73.09
[58] Field of Search ..................... 360/73.04, 73.09, 360/73.11, 73.13, 73.12, 73.14, 73.01, 70

[56] References Cited

U.S. PATENT DOCUMENTS

| | | |
|---|---|---|
| 5,144,210 | 9/1992 | Sato ........................... 360/73.14 X |
| 5,548,455 | 8/1996 | Sato ........................... 360/73.11 |
| 5,589,997 | 12/1996 | Kim ........................... 360/77.14 |
| 5,604,648 | 2/1997 | Oh ............................. 360/73.11 |

*Primary Examiner*—Aristotelis M. Psitos
*Assistant Examiner*—Larry T. Cullen

[57] ABSTRACT

The present invention relates to a capstan phase control method for a video cassette tape recorder (VCR), and an improved capstan phase control method for a VCR capable of reducing a phase locking time by detecting a new capstan phase in cooperation with a reproducing control signal and a speed detection signal whenever the speed detection signal is inputted. By adopting the detected capstan phase as a phase control information, the time required for the mode of the system to be changed from the stop mode to the reproducing mode or from the searching mode to the reproducing mode, namely while the mode of the system is changed from the speed variation mode to a normal speed mode is reduced, so that it is possible to obtain a more stable reproducing operation at a high speed.

7 Claims, 7 Drawing Sheets

CAPSTAN PHASE CONTROL METHOD FOR VIDEO CASSETTE TAPE RECORDER

BACKGROUND OF THE INVENTION

1. Field of the Invention

The present invention relates to a capstan phase control method for a video cassette tape recorder (VCR), and in particular to an improved capstan phase control method for a VCR capable of reducing a phase locking time by detecting a new capstan phase in cooperation with a reproducing control signal and a speed detection signal whenever a speed detection signal is inputted and by adopting the detected capstan phase as a phase control information.

2. Description of the Prior Art

As well known to those skilled in the art, a capstan phase control for a VCR is based on a hardware control apparatus and a software control method.

Figure 1:
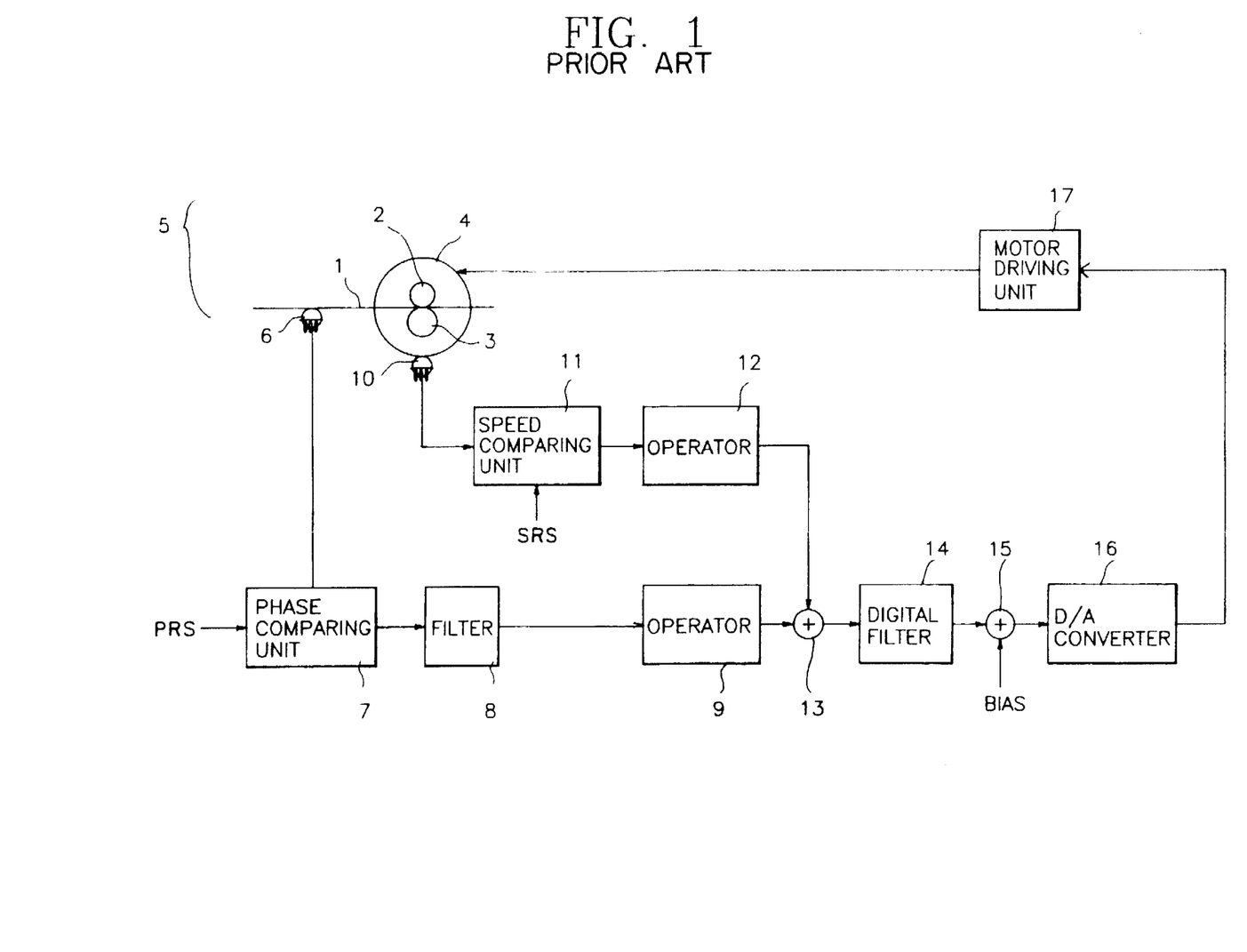
FIG. 1 is a circuit diagram of a conventional capstan phase control apparatus for a VCR.

The conventional hardware-based control apparatus, as shown in FIG. 1, includes a tape running unit 5 provided with a capstan shaft 2, a pinch roller 3, and a capstan motor 4 for running a tape 1, a control head 6 for recording/reproducing a reproducing control signal RCS on the tape 1, a phase comparing unit 7 for comparing the reproducing control signal RCS reproduced by the control head 6 with a phase reference signal PRS, a filter 8 for filtering the output of the phase comparing unit 7, an operator 9 for operating a phase gain Kp from the output of the filter 8, a speed detection head 10 for detecting the rotation speed of the capstan motor and for reproducing a speed detection signal SDS, a speed comparing unit 11 for comparing the speed detection signal SDS produces by the speed detection head 10 with a speed reference signal SRS, an operator 12 for operating a speed gain Kp from the output of the speed comparing unit 11, an adder 13 for adding the outputs of the operator 12 and the operator 9, a digital filter 14 for filtering the output of the adder, an adder 15 for adding a bias to the output of the digital filter 14, a D/A converter 16 for converting the output of the adder 15 into an analog signal, and a motor driving circuit unit 17 for driving the capstan motor 4 in accordance with the output of the D/A converter 16.

The operation of the conventional capstan phase control apparatus for a VCR will now be explained with reference to the accompanying drawings.

To begin with, when the capstan motor 4 is driven by the motor driving unit 17, the capstan shaft 2 communicating with the capstan motor shaft is rotated, and the tape 1 between the capstan shaft 2 and the pinch roller 3 is transferred.

As the tape 1 is transferred, the control head 6 reproduce the reproducing control signal RCS recorded on the tape 1, and the thusly reproduced reproducing control signal RCS is applied to the phase comparing unit 7 and compared with the phase reference signal PRS.

Thereafter, the phase comparing unit 7 outputs a phase error signal, and the thusly outputted phase error signal is multiplied with the phase gain Kp by the operator 9 through the filter 8 and is inputted to the adder 13.

Meanwhile, the speed detection signal SDS produces by the speed detection head 10 for detecting the rotation speed of the capstan motor 4 is compared with the speed reference signal SRS by the speed comparing unit 11. The speed comparing unit 11 outputs a speed error signal, and the speed error signal is inputted to the operator 12, and a certain speed gain Kv is multiplied by the operator 12 and is inputted to the adder 13.

Here, the phase error signal outputted from the operator 9 is added with the speed error signal outputted from the operator 12, and the thusly added signal is applied to the adder 15 through the digital filter 14. The adder 15 with a bias value applies the signal to the D/A converter 16, and the D/A converter 16 converts the inputted signal into an analog signal and applies to the motor driving unit 17.

The motor driving unit 17 drives the capstan motor 4 in accordance with a certain signal applied thereto, so that the control of the capstan phase is performed as reference signal PRS and the speed detection signal SDS are fed back.

Figure 2:
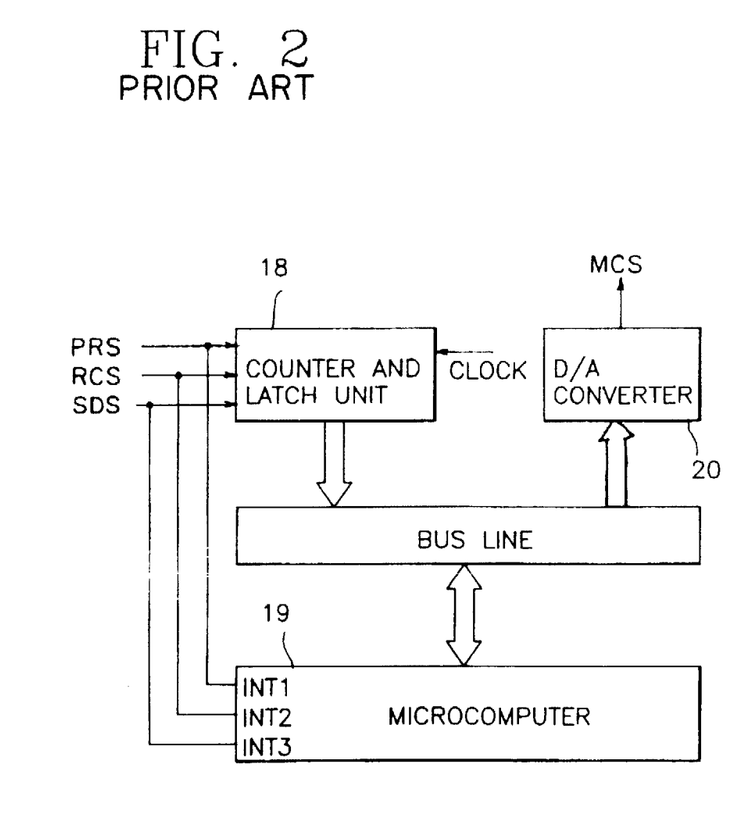
FIG. 2 is a block diagram of a conventional capstan phase control apparatus for a VCR.

Meanwhile, the conventional software-based capstan phase control method for the VCR, as shown in FIG. 2, includes a counter and latch unit 18, a microcomputer 19, and a D/A converter 20.

The Japanese Patent 2-79788 (Mar. 20, 1990) discloses a conventional software-based capstan phase control method for a VCR.

The counter and latch unit 18 counts and latches the phase reference signal PRS, the reproducing control signal RCS, and the speed detection signal SDS in accordance with an externally applied clock signal and outputs a reproducing control data and a speed detection data. In addition, the phase reference signal PRS, the reproducing control signal RCS, and the speed detection signal SDS are an interruption signal and is inputted to the microcomputer 19 through interruption terminals INT1, INT2, and INT3 of the microcomputer 19.

Figure 3A:
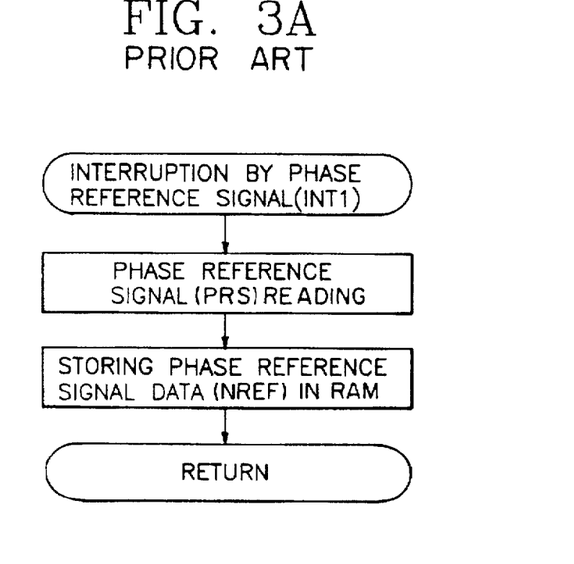

Thereafter, the microcomputer 19, as shown in FIG. 3A, reads a phase reference signal data NREF outputted from the counter and latch unit 18 through a bus line in response to the phase reference signal PRS inputted thereto through the interruption terminal INT1 and stores a phase reference signal data NREF to a RAM.

Figure 3B:
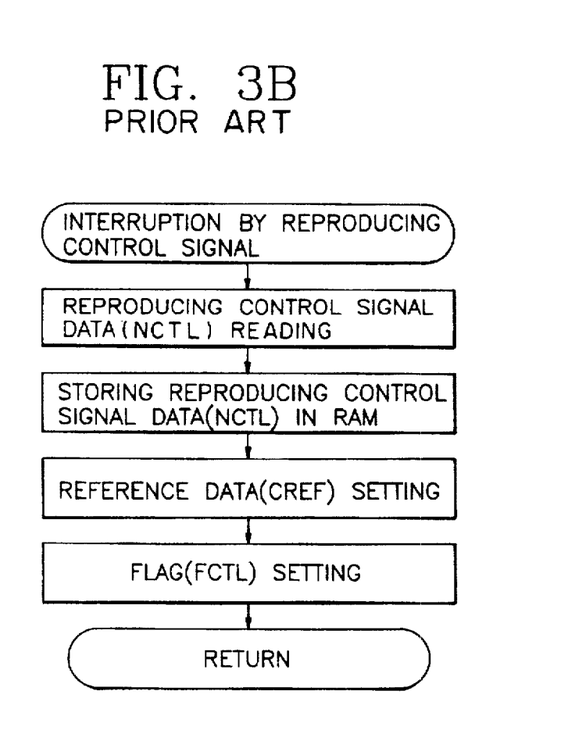

In addition, the microcomputer 19, as shown in FIG. 3B, reads a reproducing control signal data NCTL in response to the reproducing control signal RCS inputted thereto through the interruption terminal INT2 and stores a reproducing control signal data NCTL in the RAM and sets the reference data CREF of the reproducing control signal RCS and sets a state of a flag FCTL.

Figure 3C:
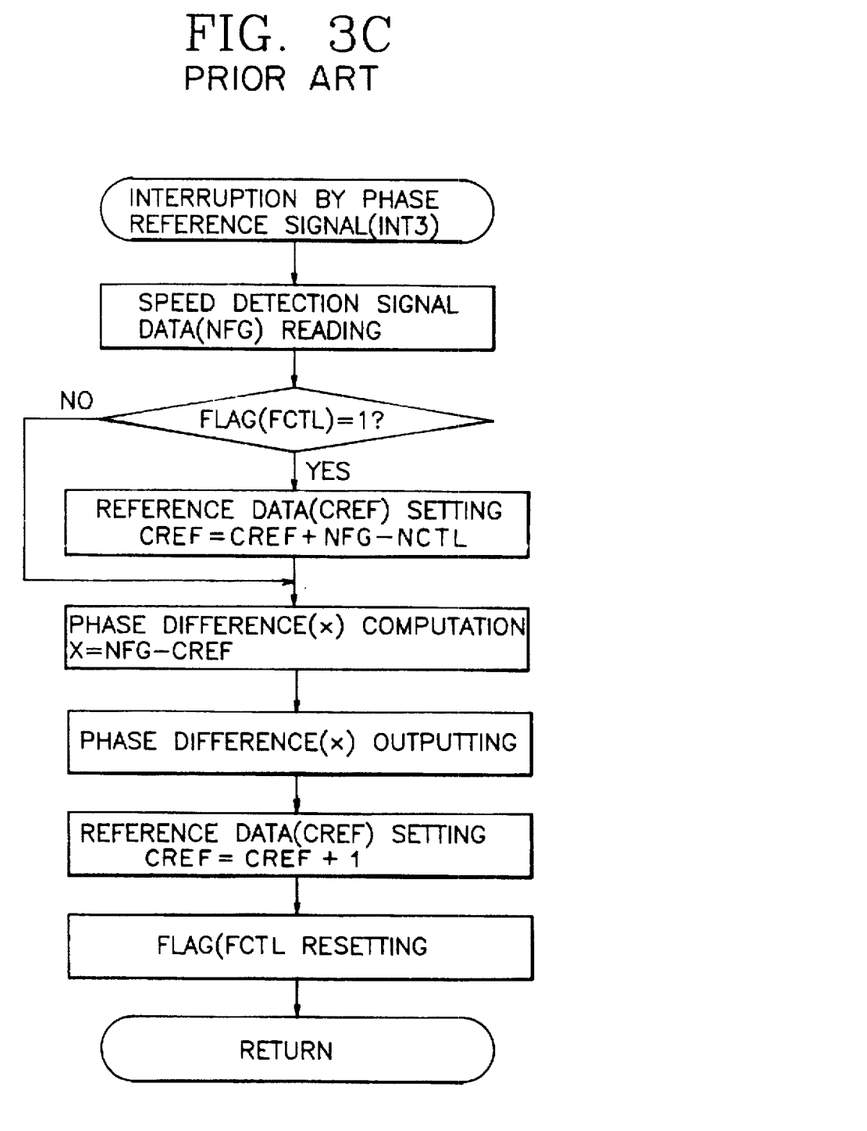

In addition, the microcomputer 19, as shown in FIG. 3C, reads a speed detection signal data NFG in response to the speed detection signal SDS inputted thereto through the interruption terminal INT3 and judges whether the the state of the flag FCTL is set as "1".

When the the state of the flag FCTL is set as "1", a reference data CREF is set. The reference data CREF is subtracted from the speed detection data NFG and a phase difference X is obtained. However, when the the state of the flag FCTL is not set as "1", a previously set reference data CREF is subtracted from the speed detection data NFG in accordance with an interruption processing routine upon the reproducing control signal RCS, and the phase difference X is obtained.

The thusly obtained phase difference X is outputted to the D/A converter 20 through a bus line, and the D/A converter 20 converts the signal inputted thereto into an analog signal and as shown in FIG. 1 outputs a motor control signal MCS to the motor driving unit 17.

Thereafter, the microcomputer 19 resets a reference data CREF and sets the state of the flag FCTL.

That is, in the conventional capstan phase control for the VCR, the comparison of the speed is performed at every arising edge or every falling edge of the speed detection signal SDS, and the comparison of a phase is performed at every rising edge of the reproducing control signal RCS, and the comparison result thereof is processed in accordance with an interruption processing routine with respect to the speed detection signal SDS as shown in FIG. 3C.

However, in the conventional capstan phase control for the VCR, although the frequency of the speed detection signal SDS has a certain frequency higher than that of the reproducing control signal RCS, since the phase comparison is performed with only the reproducing control signal, the sampling frequency is decreased, and a phase locking time until the phase of the reproducing control signal RCS coincides with the phase of the phase reference signal PRS is disadvantageously lengthened.

That is, although the capstan motor 4 is normally rotated, since the tape transmission speed of the tape differs in accordance with a diameter difference and slip amount, the frequency of the reproducing control signal RCS and the speed detection signal SDS does not become a multiple of an integer. Therefore, when performing the phase comparison using only a reproducing control signal RCS, the phase locking time becomes disadvantageously lengthened.

That is, the Japanese Patent 2-79788 discloses a technique that is directed to performing the phase comparison at every rising edge of the reproducing control signal RCS and has a disadvantage in that the phase locking time becomes long. The present invention is directed to performing a phase comparison whenever a speed detection signal SDS having a certain frequency higher than that of the reproducing control signal RCS is inputted, thus reducing the phase locking time, so that it is possible to control the capstan phase more quickly.

In addition, since the conventional art is directed to setting a certain value corresponding to the phase proceeding amount PCFG, the conventional art has the disadvantage in that it is impossible to overcome the phase error according to the surrounding environment. In contrast, the present invention can correct the phase error since it is directed to updating the phase proceeding amount PCFG for every speed detection signal SDS inputted thereto during one cycle of the reproducing control signal RCS.

For example, in case of VHS VCR, since the speed deviation is 0.5%, it is about 1% at the worst condition. That is, the maximum phase proceeding amount PCFG during one cycle of the current speed detection signal is 1%. However, although the above-mentioned phase error occurs, the conventional art is directed to performing the phase control after judging a phase error of 1% occurred in the previous speed detection signal SDS, so that the phase error can be disadvantageously increased.

In addition, although the conventional art has a disadvantage in that a phase detection error takes place since the phase proceeding amount of the first speed detection signal is computed after it is judged that the cycle of the speed detection signal and desired cycle are the same. In contrast, since the present invention newly computes the phase proceeding amount PCFG at every cycle of the speed detection signal SDS, it is possible to overcome the above-mentioned problems.

SUMMARY OF THE INVENTION

Accordingly, it is an object of the present invention to provide a capstan phase control method for a VCR, which overcome the problems encountered in a conventional capstan phase control method for a VCR.

It is another object of the present invention to provide an improved capstan phase control method for a VCR capable of reducing a phase locking time by detecting a new capstan phase in cooperation with a reproducing control signal RCS and a speed detection signal SDS whenever a speed detection signal SDS is inputted and by adopting the detected capstan phase as a phase control information.

To achieve the above objects, there is provided a capstan phase control method, which includes the steps of a phase reference signal PRS processing step which reads a current phase reference signal data NREF outputted from a counter and latch unit whenever an interruption occurs in accordance with a phase reference signal PRS, computes and stores a cycle and reference data of a phase reference signal PRS in accordance with a read current phase reference signal data NREF and a previously stored phase reference signal data NREFB, and updates the previous phase reference signal data NREFB; a reproducing control signal RCS processing step which reads and stores the reproducing control signal data NCTL outputted from the counter and latch unit whenever an interruption occurs in accordance with a reproducing control signal RCS, sets a reference data of a reproducing control signal RCS, and sets a value of a flag; a speed and phase error processing step which reads a speed detection signal CFGO data outputted from the counter and latch unit whenever an interruption occurs in accordance with a speed detection signal SDS and updates a speed error and phase error in accordance with each speed detection signal SDS inputted thereto for each cycle of a reproducing control signal RCS; and a control data output step which computes a new control data whenever a speed detection signal SDS is inputted thereto using a speed and a phase error obtained by the speed and phase error processing step and outputs the thusly computed control signal to a D/A converter.

BRIEF DESCRIPTION OF THE DRAWINGS

FIGS. 3A through 4C are flow charts of a conventional capstan phase control method for a VCR of FIG. 2.

DETAILED DESCRIPTION OF THE INVENTION

The capstan phase control method for a VCR according to the present invention includes the steps of a phase reference signal PRS processing step which reads a phase reference signal data NREF outputted from a counter and latch unit 18 whenever an interruption INT1 occurs by the phase reference signal PRS, computes a cycle NREFPRD of the phase reference signal using the current phase reference signal data NREF and a previous phase reference signal data NREFB, computes and stores a reference data REF by adopting a desired value NO of a phase control to the current phase reference signal data NREF, and sets the current phase reference signal data NREF as the previous phase reference signal data NREFB. A reproducing control signal RCS processing step which reads and stores a reproducing control signal data NCTL outputted from the counter and latch unit 18 whenever an interruption INT2 occurs in accordance with the reproducing control signal, sets the reference data REP stored during the phase reference signal processing step as a reference data CREF of the reproducing control signal RCS, and sets a flag FCTL as "1", a speed and phase error processing step which reads a speed detection signal SDS data NCFG outputted from the counter and latch unit 18 whenever an interruption INT3 occurs in accordance with a speed detection signal SDS, computes a speed error VE, initialize an accumulated value SACFG of a phase proceeding amount in accordance with a state of the flag FCTL, computes a phase proceeding amount PCFGO of a first speed detection signal CFGO after inputting the reproducing control signal RCS, and computes a phase error PE in accordance with a state of the flag FCTL, and a control data output step which computes the control data U whenever the speed detection signal SDS is inputted using the speed, the phase error and a bias which is obtained during the speed and phase error processing step, outputs the computed control data U to the D/A converter 20, and updates the accumulated value SAPCFG of the number M of the speed detection signal SDS, the previous speed detection signal data NCFGB, the flag FCTL, and the phase proceeding amount.

The process of a capstan phase control in accordance with the capstan phase control method for the VCR will now be explained with reference to the accompanying drawings.

Figure 4A:
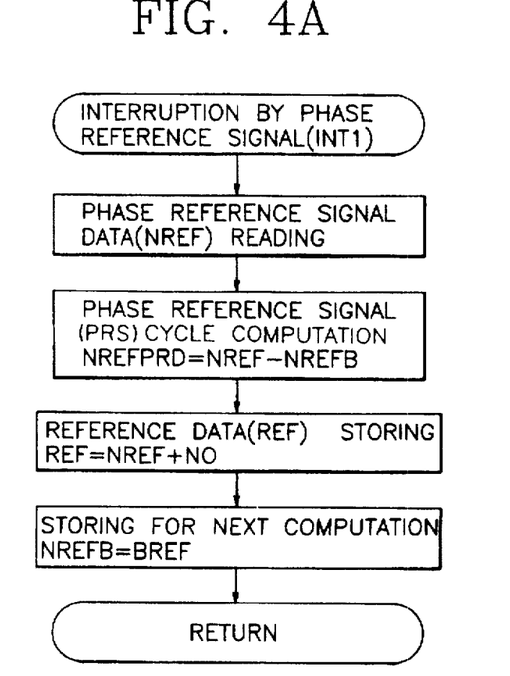
FIGS. 4A through 4C are flow charts of a capstan phase control method for a VCR according to the present invention.

To begin with, in the phase reference signal PRS processing step, the microcomputer 19 performs a routine as shown in FIG. 4A whenever an interruption INT1 occurs due to the phase reference signal PRS. That is, when the interruption INT1 occurs, the microcomputer 19 reads the phase reference signal data NREF latched by the counter and latch unit 18 and computes a difference between the read phase reference signal data NREF and the previously read phase reference signal data NREFB and computes the cycle NREFPRD of the phase reference signal PRS and stores the cycle NREFPRD of the computed phase reference signal PRS.

Thereafter, the microcomputer 19 adds the current phase reference signal data NREF to a desired value NO of the phase control and computes the reference data REF and stores the thusly computed data. The thusly stored reference data REF is used in order to control that a certain value so that the difference between the previous reproducing reference signal data NREFB and the reproducing control signal data NCTL corresponding to the reproducing control signal RCS which is at a rising edge results in the desired value of the phase control NO.

Thereafter, the microcomputer 19 sets the current phase reference signal data NREF as the previous phase reference signal data NREF and stores the same and returns the control process to the initial stage of the routine. Here, the phase reference signal data NREFB stored is used for the next phase reference interruption.

Figure 4B:
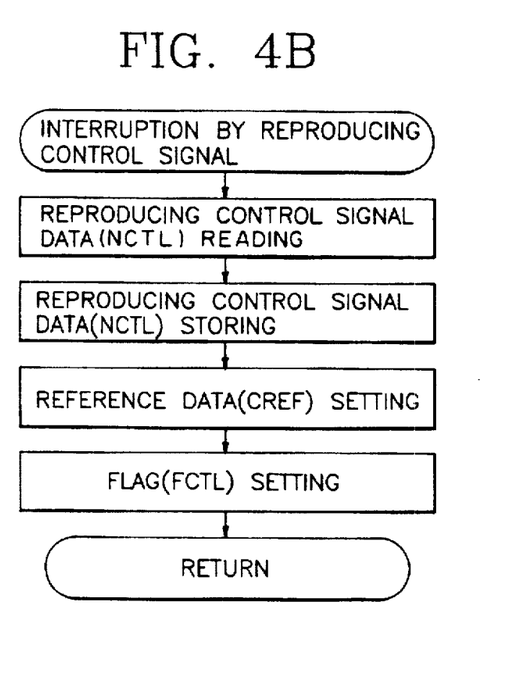

In the reproducing control signal RCS processing step, the microcomputer 19 performs a certain routine as shown in FIG. 4B whenever the interruption INT2 occurs in accordance with the reproducing control signal RCS. That is, when the interruption INT2 occurs, the microcomputer 19 reads and stores the reproducing control signal data NCTL latched by the counter and latch unit 18, and the thusly stored reproducing control signal data NCTL is used for the speed and phase error processing step.

The microcomputer 19 sets the reference data REF stored during the phase reference signal PRS processing step as the reference data CREF of a reproducing control signal RCS and stores the same. Since the timing between the latch of the phase reference signal data NREF and the latch of the reproducing control signal data NCTL do not coincide, in the event the phase error PE is computed using the reference data REF, the reference data REF may be increased by one cycle, so that the reference signal REF set during the control signal processing step is not varied until the next control signal interruption.

Thereafter, the microcomputer 19 sets the flag FCTL as "1" and returns the control to the initial stage of the routine, and the flag FCTL is used for judging whether the reproducing control signal RCS is inputted or not in the speed and phase error processing step.

Figure 4C:
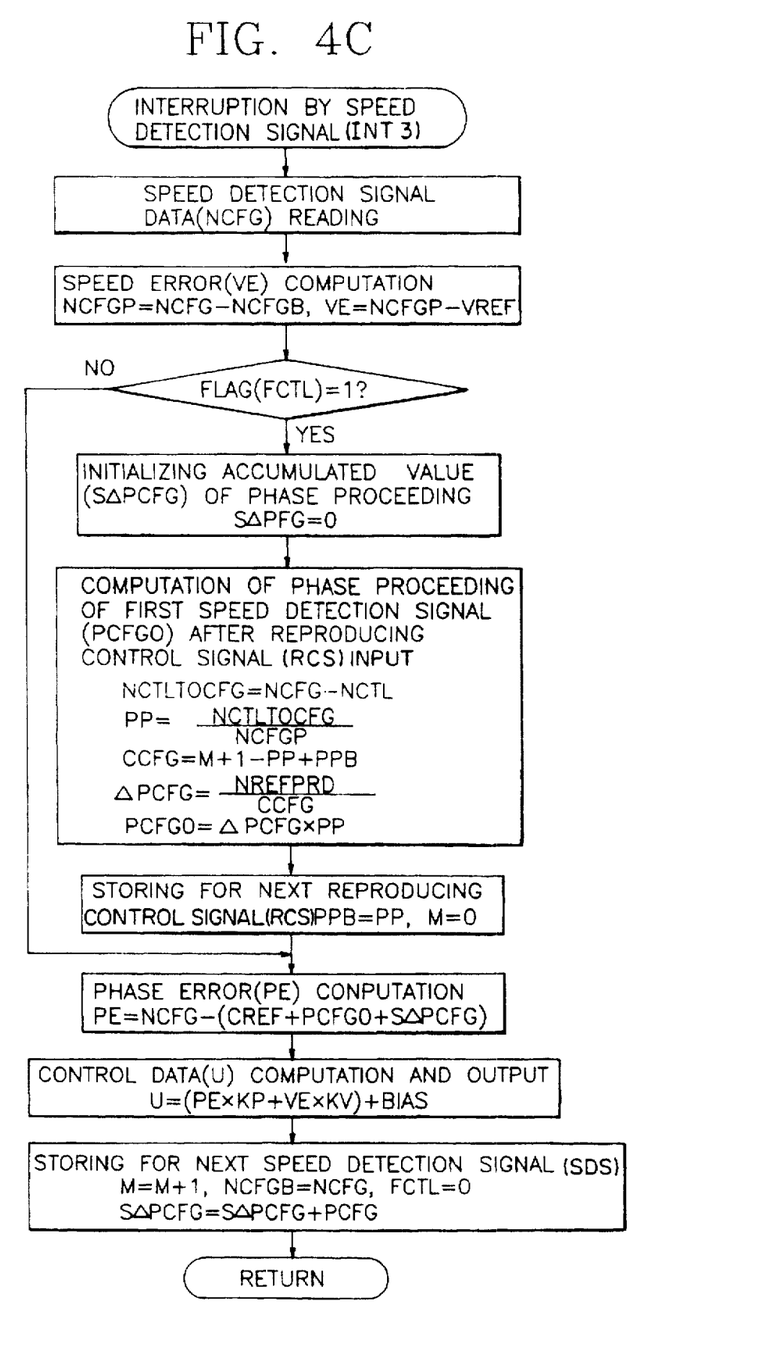

Meanwhile, in the speed and phase error processing step, the microcomputer 19 performs a routine as shown in FIG. 4C whenever the interruption INT3 occurs in accordance with the speed detection signal SDS.

The speed and phase error processing step will now be explained in more detail with reference to FIG. 4.

When the interruption occurs in a step S00, the microcomputer 19 reads a speed detection signal data NCFG latched by the counter and latch unit 18. Thereafter, in a step S10, the microcomputer 19 subtracts the previously read speed detection signal data NCFGB from the current speed detection signal data NCFG and computes a cycle count value NCFGP of the speed detection signal and subtracts the speed reference value VREF from the cycle count value NCFGP of the speed detection signal SDS and computes a speed error. Here, the speed reference value VREF is a certain value previously set as the number of counts of the speed detection signal SDS at a desired speed.

After the speed error VE is computed, the microcomputer 19 detects the flag FCTL set during the reproducing control signal RCS processing step S14.

At this time, when the flag FCTL is set as "1", it denotes that the first speed detection signal CFGO is inputted after the reproducing control signal RCS is inputted, and the accumulated value SAPCFG of the phase proceeding amount is set as "0" in the step S16.

Here, whenever the speed detection signal SDS is inputted, the phase proceeding amount of the speed detection signal is accumulated. That is, whenever the reproducing control signal RCS is processed by one cycle, the phase proceeding amount is computed, and the thusly computed phase proceeding amount becomes the accumulated value SAPCFG of the phase proceeding amount.

After the reproducing control signal RCS is inputted, the phase proceeding amount of the first speed detection signal CFGO is computed during the following step S18.

To begin with, the microcomputer 19 subtracts the reproducing control signal data NCTL stored during the reproducing control signal RCS processing step from the speed detection signal data NCFG inputted thereto through a bus line and computes the number of counts NCTLTOCFG from the time when the reproducing control signal RCS is inputted until the time when the first speed detection signal CFGO is inputted.

Thereafter, the microcomputer 19 divides the number of counts NCTLTOCFG into cycle count values NCFGP of the speed detection signal SDS and computes the time ratio between the input timing of the reproducing control signal RCS corresponding to the first speed detection signal CFGO' and the input timing of the first speed detection signal CFGO'.

In addition, the microcomputer 19 divides the number of the counts NCTLTOCFG by a cycle count value NCFGP of the speed detection signal SDS and computes the time ratio between an input timing of the reproducing control signal RCS corresponding to the first speed detection signal CFGO' and an input timing of the first speed detection signal CFGO'.

Figure 5:
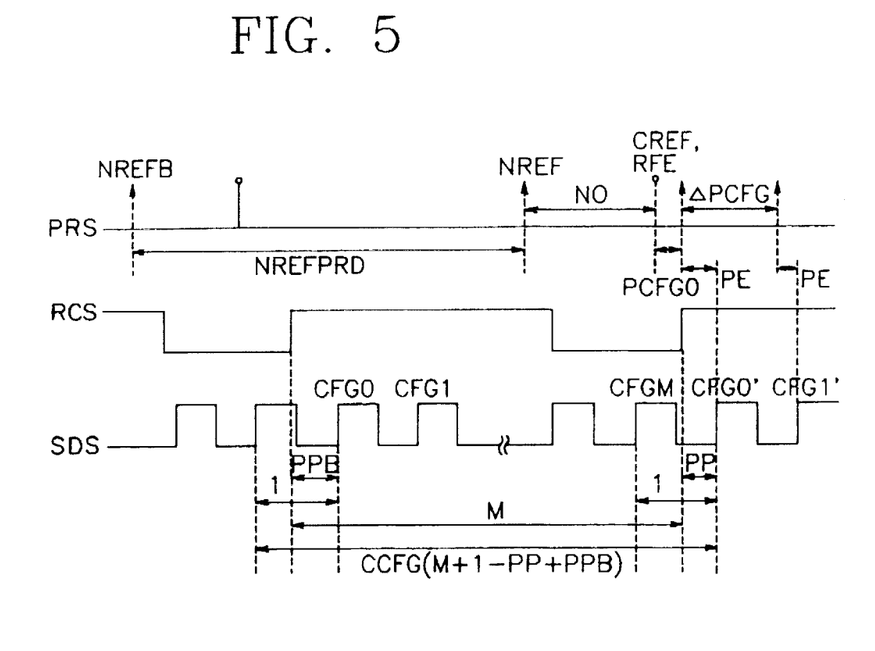
FIG. 5 is a view of timings of a signal of each flow of FIGS. 4A through 4C according to the present invention.

In addition, the microcomputer 19 computes the number CCFG of the speed detection signal SDS which is inputted thereto for one cycle of the reproducing control signal RCS as shown in FIG. 5 using the time ratio PP, a time ratio PPB between the previous reproducing control signal RCS and the first speed detection signal CFGO which is computed in the same manner above, and a number M of the speed detection signal SDS from the first speed detection signal CFGO after the previous reproducing control signal RCS and until the first speed detection signal CFGO' after the current reproducing control signal RCS.

Therefore, when the cycle NREFPRD of the phase reference signal NREF computed during the phase reference signal PRS processing step is divided into a predetermined number of speed detection signals SDS, the phase proceeding amount $\Delta$PCFG of the speed detection signal SDS, which is referred to a desired number of counts to be proceeded during one cycle of speed detection signal SDS, is obtained.

Thereafter, the phase proceeding amount PCFGO of the first speed detection signal CFGO' after the reproducing control signal RCS is inputted is obtained in accordance with a multiplication between the phase proceeding amount $\Delta$PCFG of the speed detection signal SDS and the time ratio PP.

After the phase proceeding amount PCFGO of the speed detection signal CFGO' with respect to the current phase control signal PCS is computed, the time ratio PP is substituted with the time ratio PPB in a step S20, and the number M of the speed detection signal SDS is set as "0".

In a step S22, the microcomputer computes a phase error RE using the speed detection signal data NCFG, the phase proceeding amount PCFGO of the speed detection signal CFGO', the accumulated value S$\Delta$PCFG of the phase proceeding amount, and the reference data CREF of the reproducing control signal RCS set during the reproducing control signal RCS processing process.

In a step S24, the microcomputer 19 multiples the phase error PE and the speed error VE by gains Kp and Kv, respectively, and adds a bias value thereto, and computes a control data U, and applies the thusly computed control data U to the D/A converter 20 through a bus line.

Here, the bias value is a certain value that the speed error VE and the phase error PE are close to "0" in a normal state.

In a step S26, for the phase control with respect to a second speed detection signal CFG1', the microcomputer 19 increases the number M of the speed detection signal SDS by "1" and sets the current speed detection signal data NCFG as a previous speed detection signal data NCFGB and updates the previous speed detection signal data NCFGB and rests the flag FCTL as "0". In addition, the microcomputer 19 adds the accumulated value S$\Delta$PCFG of the current phase proceeding amount and the phase proceeding amount $\Delta$PCFG of the speed detection signal SDS and updates the accumulated value S$\Delta$PCFG of the current phase proceeding amount and returns the control to the initial stage of the routine.

Meanwhile, when the second speed detection signal CFG1' is inputted and the interruption INT3 occurs, in the steps S10, S12, and S14, the microcomputer 19 reads the speed detection signal data NCFG through a bus line and computes the speed error VE and detects a flag FCTL. At this time, since the flag FCTL is previously set at "0" on, the microcomputer 19 directly performs the step S22 and computes the new phase error PK. That is, when the first speed detection signal CFGO is inputted, the microcomputer 19 computes the new phase error PE using the previously computed accumulated value S$\Delta$PCFG, the phase proceeding amount PCFGO of the speed detection signal CFGO', the speed detection signal data NCFG, and the reference data CREF of the reproducing control signal RCS set during the reproducing control signal RCS processing step.

Thereafter, in the step S24, the microcomputer 19 computes a new control data U and outputs to the D/A converter 20, and performs a step S26 again and returns the control step to the initial step of the routine.

That is, the microcomputer 19 sequentially performs the steps S00–S14 and S22–S26 and updates the number of the speed detection signal SDS inputted thereto for one cycle of the reproducing control signal RCS and controls the phase error in accordance with each speed detection signal SDS inputted thereto.

In addition, during the next cycle of the reproducing control signal RCS, the microcomputer 19 performs the reproducing control signal RCS processing step again, and sequentially performs the steps S00–S26.

As described above, the capstan phase control method for a video cassette tape recorder according to the present invention is directed to reducing the phase locking time and the time taken while the mode of the system is changed from the stop mode to the reproducing mode, from the searching mode to the reproducing mode, and from the speed variation mode to a normal speed mode, so that it is possible to obtain a more stable reproducing operation at a high speed.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A capstan phase control method for a video cassette tape recorder, comprising the steps of:

a phase reference signal processing step which reads a current phase reference signal data outputted from a counter and latch unit whenever an interruption occurs in accordance with the phase reference signal, computes and stores a cycle and reference data of the phase reference signal in accordance with the read current phase reference signal data of the previously stored phase reference signal data, and updates said previous phase reference signal data;

a reproducing control signal processing step which reads and stores the reproducing control signal data outputted from said counter and latch unit whenever an interruption occurs in accordance with the reproducing control signal, sets a reference data of the reproducing control signal, and sets a value of a flag;

a speed and phase error processing step which reads a speed detection signal data outputted from the counter and latch unit whenever an interruption occurs in accordance with a speed detection signal and updates a speed error and phase error in accordance with each speed detection signal inputted thereto for each cycle of the reproducing control signal; and a control data output step which computes a new control data whenever the speed detection signal is inputted thereto using the speed and the phase error obtained by said speed and phase error processing step and outputs the thusly computed control signal to a D/A converter.

2. The method of claim 1, wherein said speed and phase error processing step includes the steps of:

a first step which reads the speed detection signal data when an interruption occurs in accordance with the speed detection signal and computes the speed error, a second step which initializes an accumulated value of a phase proceeding amount in accordance with the state of the flag and computes the phase proceeding amount of a first speed detection signal after a current reproducing control signal is inputted; and a third step which computes a phase error with respect to the phase proceeding amount corresponding to each speed detection signal in accordance with the state of the flag.

3. The method of claim 2, wherein said first step includes the steps of:

a fourth step which subtracts the previously read speed detection signal data from the current speed detection signal data and computes a cycle counter value of the speed detection signal; and a fifth step which computes a speed error by subtracting the speed reference value from the cycle counter value of the speed detection signal, wherein said speed reference value is referred to a previously set certain value corresponding to the number of counts of the speed detection signal at a desired speed.

4. The method of claim 2, wherein said second step includes the steps of:

a sixth step which subtracts the reproducing control signal data stored during said reproducing control signal processing step from the speed detection signal data and computes the number of counts from the input timing of the current reproducing control signal to the input timing of the first speed detection signal;

a seventh step which divides the number of counts into cycle count values of the speed detection signal and computes a first time ratio between the input timing of the current reproducing control signal and the input timing of the first speed detection signal after the current reproducing control signal is inputted;

an eighth step which computes the time ratio, a second time ratio between the input timing of the first speed detection signal after the previous reproducing control signal is inputted with respect to the input timing of the previous reproducing control signal, and the number of the speed detection signals from the first speed detection signal after the previous reproducing control signal to the first speed detection signal after the current reproducing control signal and computes the number of the speed detection signal inputted thereto during one cycle of the reproducing control signal;

a ninth step which divides the cycle of the phase reference signal computed during said phase reference signal processing step into a certain number of the speed detection signal and computes a phase proceeding amount of the speed detection signal which is referred to a desired number of counts to be proceeded during one cycle of the speed detection signal;

a tenth step which multiplies the first time ratio with the phase proceeding amount of the speed detection signal and computes the phase proceeding amount of the first speed detection signal after the current reproducing control signal is inputted; and an eleventh step which sets the first time ratio as the second time ratio for the next reproducing control signal and initialize the number of the speed detection signals.

5. The method of claim 2, wherein said third step is directed to adding the reference data previously set during the reproducing control signal processing step, the accumulated value of the phase proceeding amount and the phase proceeding amount of the first speed detection signal after the current reproducing control signal is inputted and subtracting the thusly added value from the speed detection signal data and computing the phase error.

6. The method of claim 1, wherein said control data output step is directed to multiplying the phase error by the gain corresponding to the phase error, multiplying the speed error by the gain corresponding to the speed error, adding the thusly multiplied values and a bias value, and computing the control data.

7. The method of claim 1, wherein said control data output step is directed to increasing the number of the speed detection signals by "1", setting the current speed detection signal data as the previous speed detection signal data, resetting the value of the flag, and adding the accumulated value of the phase proceeding amount and the phase proceeding amount of the speed detection signal.

* * * * *